(12) United States Patent
Kamigama et al.

(10) Patent No.: US 7,322,094 B2
(45) Date of Patent: Jan. 29, 2008

(54) METHOD FOR MANUFACTURING A HEAD STACK ASSEMBLY

(75) Inventors: Takehiro Kamigama, Hong Kong (CN); Yiu Sing Ho, Hong Kong (CN); Canhua Chen, Dongguan (CN)

(73) Assignee: SAE Magnetics (HK) (CN)

( * ) Notice: Subject to any disclaimer, the term of this patent is extended or adjusted under 35 U.S.C. 154(b) by 500 days.

(21) Appl. No.: 10/832,444

(22) Filed: Apr. 27, 2004

(65) Prior Publication Data

US 2005/0237672 A1   Oct. 27, 2005

(51) Int. Cl.
*G11F 5/127* (2006.01)
*H04R 31/00* (2006.01)

(52) U.S. Cl. ............... 29/603.04; 29/603.03; 29/603.06; 29/893.33; 72/343; 72/362; 83/29; 83/35; 83/36; 83/50; 360/266.1; 360/265.7; 360/240; 360/244.2; 360/244.8

(58) Field of Classification Search ............ 29/603.03, 29/603.04, 603.06, 893.33; 83/29, 35, 36, 83/50; 72/343, 362; 360/266.1, 265.7, 240, 360/244.2, 244.8, 294.4–294.7, 264.7–264.9
See application file for complete search history.

(56) References Cited

U.S. PATENT DOCUMENTS

| | | | | |
|---|---|---|---|---|
| 5,319,512 A | * | 6/1994 | Grapenthin | 360/265.9 |
| 6,166,888 A | * | 12/2000 | Tsuda et al. | 360/264.2 |
| 7,161,769 B1 | * | 1/2007 | Chang et al. | 360/265.9 |

* cited by examiner

*Primary Examiner*—Paul D. Kim
(74) *Attorney, Agent, or Firm*—Kening Li (57) ABSTRACT

A head stack assembly of a disk drive unit including a head arm assembly (HAA) having a head gimbal assembly, a drive arm to be connected with the head gimbal assembly; wherein the drive arm comprises a securing portion, a connection portion and a spacer connecting the securing portion with the connection portion. In the present invention, at least one undercut is formed on the spacer of the drive arm to strengthen the drive arm. The invention also discloses a method of manufacturing such a head stack assembly.

20 Claims, 12 Drawing Sheets

METHOD FOR MANUFACTURING A HEAD STACK ASSEMBLY

FIELD OF THE INVENTION

The present invention relates to disk drive units and manufacturing method thereof, and more particularly to a HSA (head stack assembly) and manufacturing method thereof.

BACKGROUND OF THE INVENTION

Figure 1:
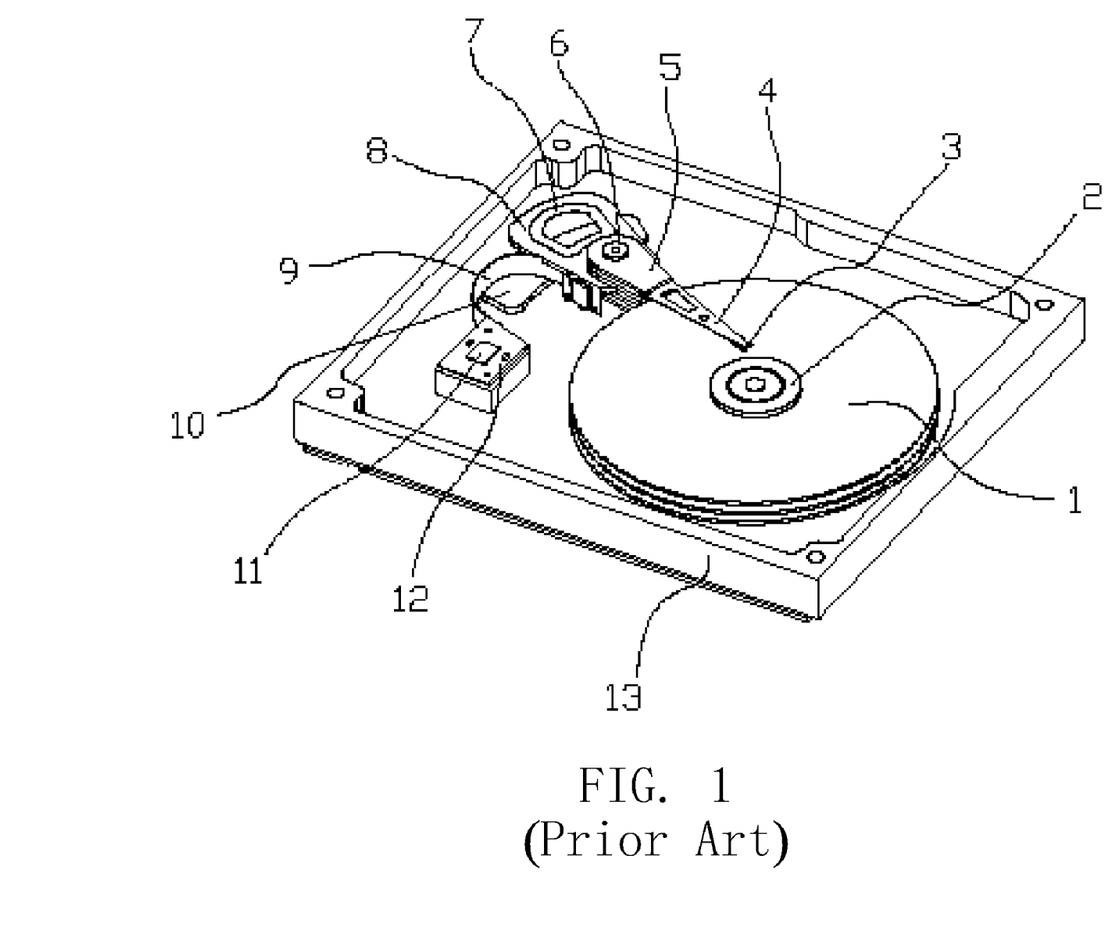
FIG. 1 is a perspective view of a traditional disk drive.

Disk drives are information storage devices that use magnetic media to store data. Referring to FIG. 1, a typical disk drive in prior art comprises a drive arm 5, a head gimbal assembly (HGA) 4 with a slider 3 being coupled to the drive arm 5 (the drive arm and the HGA with the slider also known as head stack assembly (HSA)), a magnetic disk 1 mounted on a spindle motor 2 which causes the magnetic disk 1 to spin, and a disk drive base plate 13 to enclose the above-mentioned components. The slider 3 flies over the surface of the magnetic disk 1 at a high velocity and is positioned radially by a voice coil 7 embedded (e.g. by epoxy potting or overmolding) in a fantail spacer 8 to read data from or write data to concentric data tracks on the magnetic disk 1. Generally, a voice coil motor (VCM) 10 is used to drive the voice coil 7.

Figure 2A:
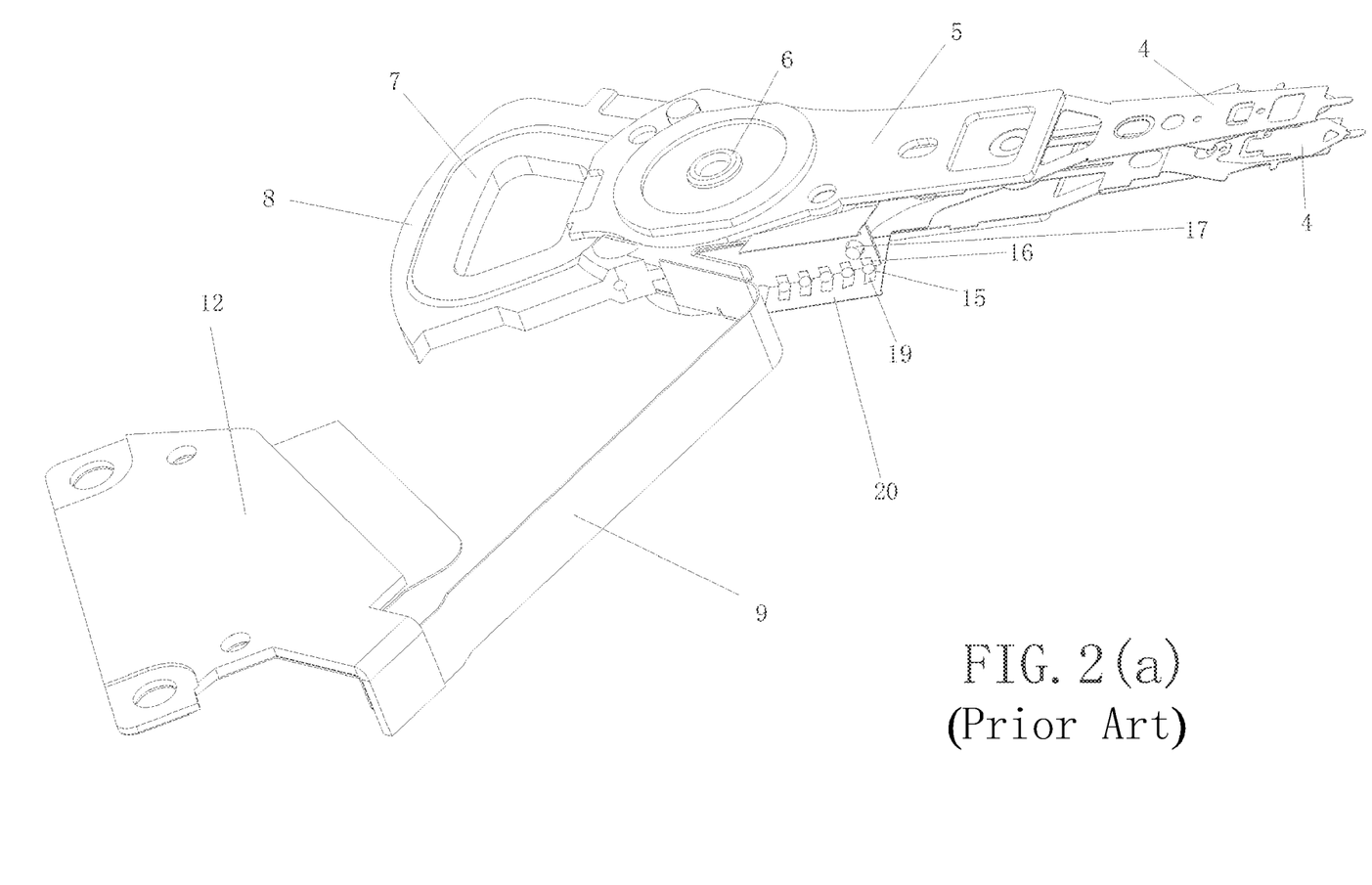
FIG. 2(a) is a perspective view of a traditional head stack assembly (HSA)
Figure 3:
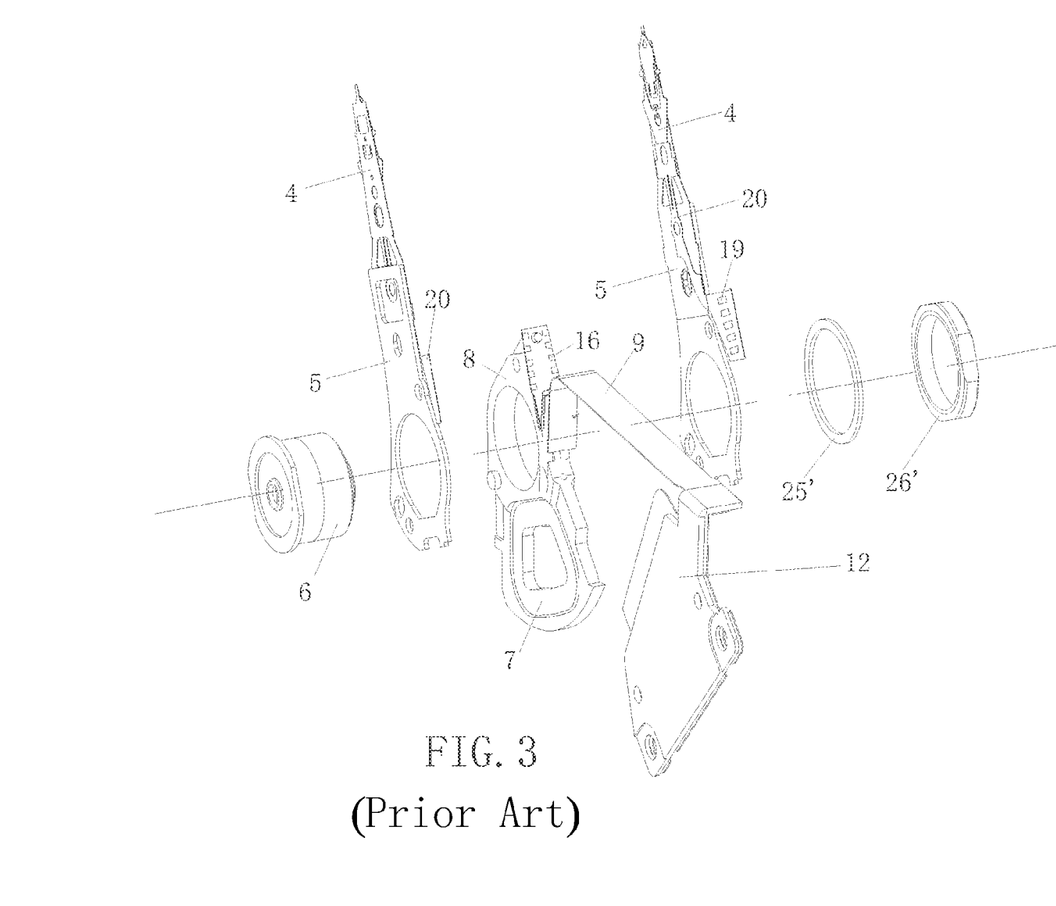
FIG. 3 is an exploded, perspective view of the HSA in FIG. 2(a)

Referring to FIGS. 2(a) and 3, a traditional head stack assembly (HSA) comprises an independent fantail spacer 8 which is interposed between two pieces of the drive arms 5 and combines with the drive arms 5 together with a securing means. The securing means is consisted of a pivot member 6, a washer 25' and a nut 26'. In the prior art, the HGA 4 is coupled to the drive arm 5 by laser welding or swaging the suspension of the HGA 4 with the drive arm 5. The drive arms 5 each have a suspension flexure cable 20 running from the sliders 3 to a plurality of bonding pads 19. The suspension flexure cable 20 is secured to the suspension of the HGA 4 by laser welding or adhesive.

Figure 2B:
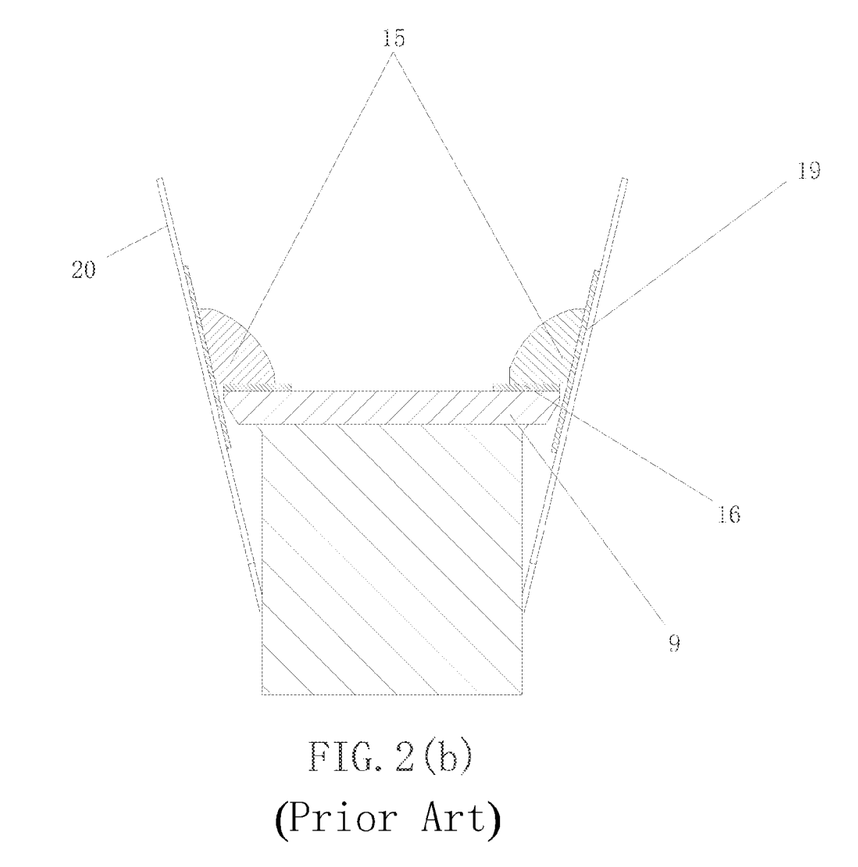
FIG. 2(b) is an enlarged, cross-sectional view of an electrical connection between suspension flexure cables and FPCA of the HSA of FIG. 2(a)

In typical disk drives, referring to FIGS. 2(a) and 2(b), electrical control signals are communicated to the voice coil 7 by a flexible printed circuit assembly (FPCA) 9. The bonding pads 19 of the suspension flexure cable 20 are electrically connected with the FPCA 9 by using connection balls 15 (e.g., by soldering or ultrasonic bonding) to bond the bonding pads 19 to a plurality of connecting pads 16 of the FPCA 9. Thus, the FPCA 9 may communicate read/write data to the slider(s) 3. In addition, referring to FIG. 1, a printed circuit board (PCB) 11 mounted on a bracket 12 is provided to control the position of the drive arm(s) 5 with the slider(s) 3.

With reference to FIG. 2(a), the FPCA 9 is aligned with the fantail spacer 8 at an end thereof by an alignment pin 17 protruding from the fantail spacer 8. After positioning, the FPCA 9 will be electrically coupled to the HGA 4.

However, because the traditional HSA use the independent fantail spacer 8 to partition the two pieces of the drive arms 5, and manufacturing the fantail spacer 8 takes much time and money, the cost of the HSA becomes higher and the manufacturing process becomes more complicated.

It is therefore desirable to provide a HSA of a disk drive unit and manufacturing method thereof to solve the above-mentioned problems.

SUMMARY OF THE INVENTION

A main feature of the present invention is to provide a low-cost HSA of a disk drive unit which is easily manufactured and a manufacturing method thereof.

To achieve the above-mentioned feature, a head stack assembly of a disk drive unit of the present invention comprises a head arm assembly (HAA) having a head gimbal assembly, a drive arm to be connected with the head gimbal assembly; wherein the drive arm comprises a securing portion, a connection portion and a spacer connecting the securing portion with the connection portion.

In the present invention, at least one undercut is formed on the spacer of the drive arm to strengthen the drive arm. The head stack assembly further comprises an additional HAA having a second head gimbal assembly (HGA), a second drive arm to be connected with the second HGA, and a voice coil embedded in the second drive arm. The additional HAA is coupled with the HAA by a securing means. In addition, a bracket is positioned on one side of the second drive arm, which comprises a bracket body having at least one bracket clamp extending from one side thereof and at least one alignment pin formed thereon, and a guiding rail extending from one end of the bracket body.

In the present invention, the additional HAA further comprises a flexible printed circuit assembly (FPCA) having a flexible printed circuit (FPC) having at least one alignment hole corresponding to the at least one alignment pin, a U-shaped connector attached to one end of the FPC, and a connection leg extending from one side of the FPC; the FPCA is aligned with the bracket by the alignment pin and fixed by the bracket clamp. The connection leg has two voice coil pads and a grounding pad formed thereon, the second drive arm is provided with a grounding pin and two connection pins near the bracket which are electrically coupled with the connection pins and the grounding pin, respectively. In addition, each of the two head gimbal assemblies has a suspension flexure cable with a plurality of bonding pads provided thereon, and the U-shaped connector comprises two connection plates each having a plurality of connecting pads thereon to electrically connect with the bonding pads of the two suspension flexure cables.

According to the present invention, a method for manufacturing a head stack assembly of a disk drive unit comprising a step of forming a head arm assembly, which comprises the steps of: forming a head gimbal assembly; providing a raw drive arm and stamping it to form a spacer; and coupling the head gimbal assembly with the stamped drive arm together. In the present invention, forming the head arm assembly further comprises forming at least one undercut on the spacer.

Also, the method further comprises the steps of forming an additional head arm assembly (HAA) and assembling the two head arm assemblies together by a securing means. Forming the additional head arm assembly comprises the steps of: forming a second head gimbal assembly, a second drive arm and a voice coil; coupling the second head gimbal assembly, the second drive arm and the voice coil together. In the present invention, forming the second drive arm comprises forming a bracket on one side thereof. Forming the bracket comprises a step of forming a guiding rail and a bracket body having at least one bracket clamp and at least one alignment pin. Forming the additional head arm assembly further comprises forming a flexible printed circuit assembly thereon. Hereinto, forming the flexible printed circuit assembly comprises the steps of: forming a flexible printed circuit having at least one alignment hole and a connection leg; forming a U-shaped connector; and coupling the flexible printed circuit with the U-shaped connector together.

In the present invention, forming the additional HAA further comprises the steps of aligning the flexible printed circuit assembly with the bracket by the at least one alignment pin and fixing it by the at least one bracket clamp. And, forming the connection leg comprises forming two voice coil pads and a grounding pad thereon, and forming the second drive arm comprises forming a grounding pin and two connection pins thereon. In addition, forming the additional head arm assembly further comprises electrically coupling the two voice coil pads and the grounding pad with the connection pins and the grounding pin, respectively.

In the present invention, forming the U-shaped connector comprises forming two connection plates each having a plurality of connecting pads thereon, and forming each of the two head gimbal assemblies comprises forming a suspension flexure cable having a plurality of bonding pads thereon. Also, forming the additional HAA further comprises electrically coupling the connecting pads of the two connection plates with the bonding pads of the two suspension flexure cables, respectively.

Comparing with the prior art, the head stack assembly of the present invention has the drive arm formed a step thereon as a spacer to partition the two head arm assemblies. Therefore, an independent fantail spacer is saved and accordingly the manufacturing process of the HSA becomes easier and the cost thereof becomes lower. In addition, by forming a step on the drive arm, the securing means does not protrude from the HAA as a traditional HSA. Thus, the HSA of the present invention can be made thinner. Furthermore, the design of the special bracket on the first HAA and the corresponding FPCA makes the electrical and physical connection therebetween more reliable.

Other objects, advantages and novel features of the invention will become more apparent from the following detailed description of a preferred embodiment thereof when taken in conjunction with the accompanying drawing. accompanying drawings, wherein:

DETAILED DESCRIPTION OF THE INVENTION

Figure 4:
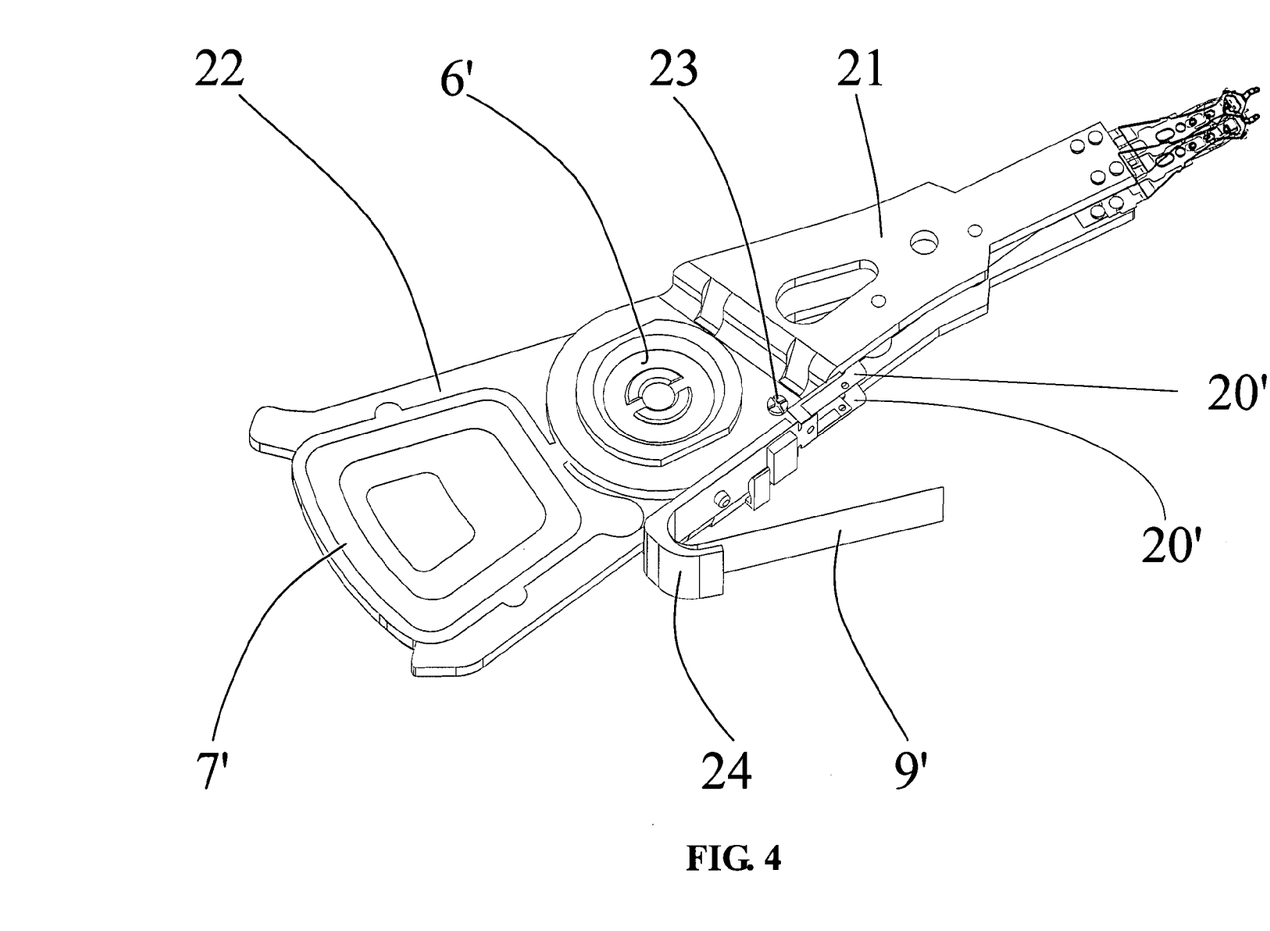
FIG. 4 is a perspective view of a HSA according to the present invention.

Referring now to the drawings in detail, FIG. 4 shows an HSA of a disk drive unit according to an embodiment of the present invention. The HSA comprises a first head arm assembly (HAA) 21 and a second head arm assembly (HAA) 22 coupled to the first HAA 21 by securing means (not labeled). In an embodiment of the present invention, see FIG. 5, the securing means comprises a pivot 6', a washer 25, a nut 26 and a screw 23.

Figure 8:
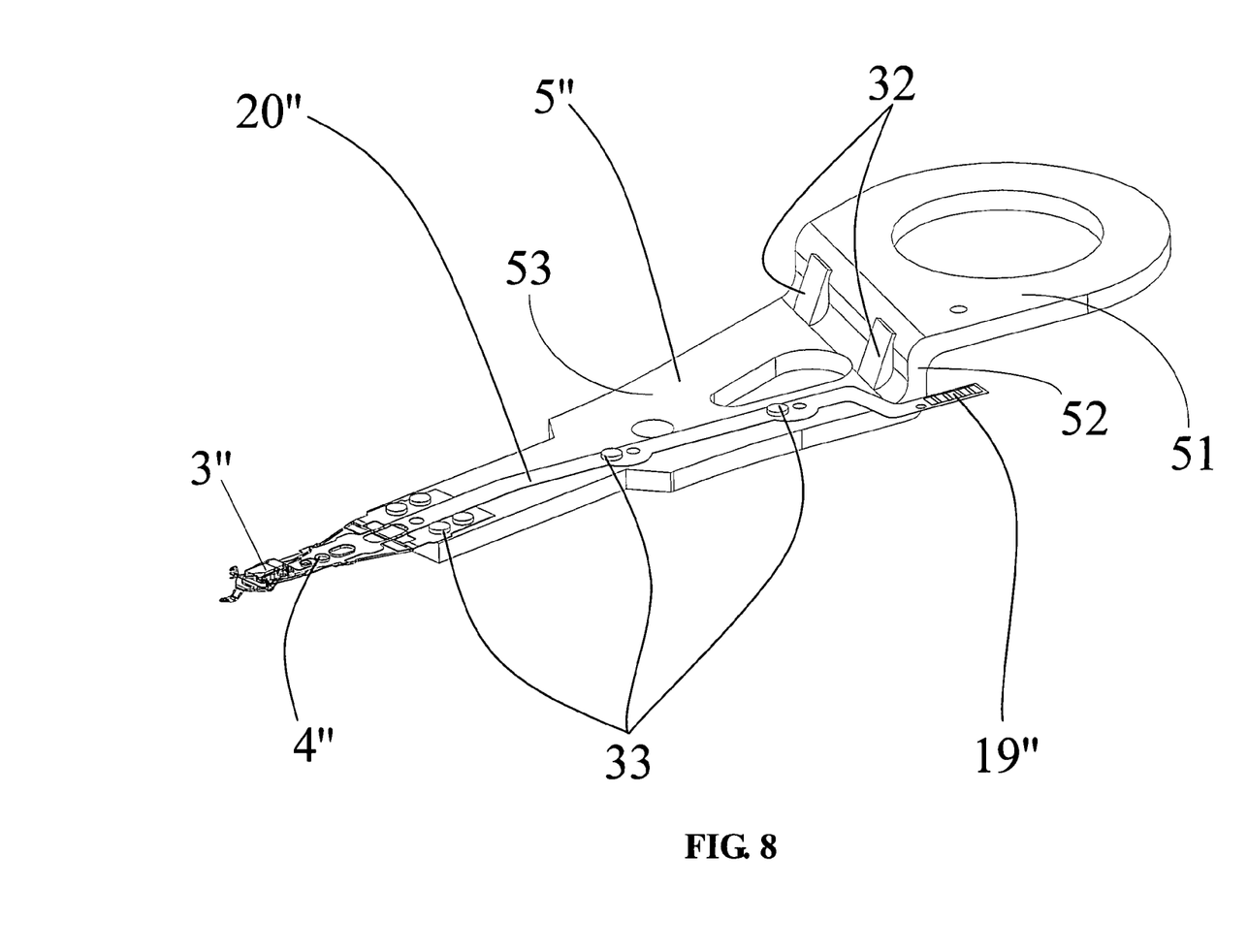
FIG. 8 is a perspective view of a first HAA of the HSA showing in FIG. 5.

With reference to FIG. 8, the first HAA 21 comprises a first head gimbal assembly (HGA) having a first suspension 4" and a first slider 3", and a first drive arm 5" to be connected with the first suspension 4". The first suspension 4" is provided a first suspension flexure cable 20" coupled thereon. In an embodiment of the present invention, the first suspension 4" is overmolded onto the first drive arm 5" and the first suspension flexure cable 20" are coupled with the first suspension 4" by overmold as well. The first drive arm 5" is stamped to form a step constructed by a securing portion 51, a connection portion 53 and a spacer 52 connecting the securing portion 51 with the connection portion 53. Two undercuts 32 are made on the spacer 52 to strengthen the first drive arm 5". In the present invention, because a step is formed on the first drive arm 5", so the pivot 6' does not protrude from the first HAA 21 as a traditional HSA. Thus, the HSA of the present invention can be made thinner because the height of the pivot 6' contributes to the total height of the HSA. Additionally, the first suspension flexure cable 20" is also provided with a plurality of bonding pads 19" on an end thereof.

Figure 6:
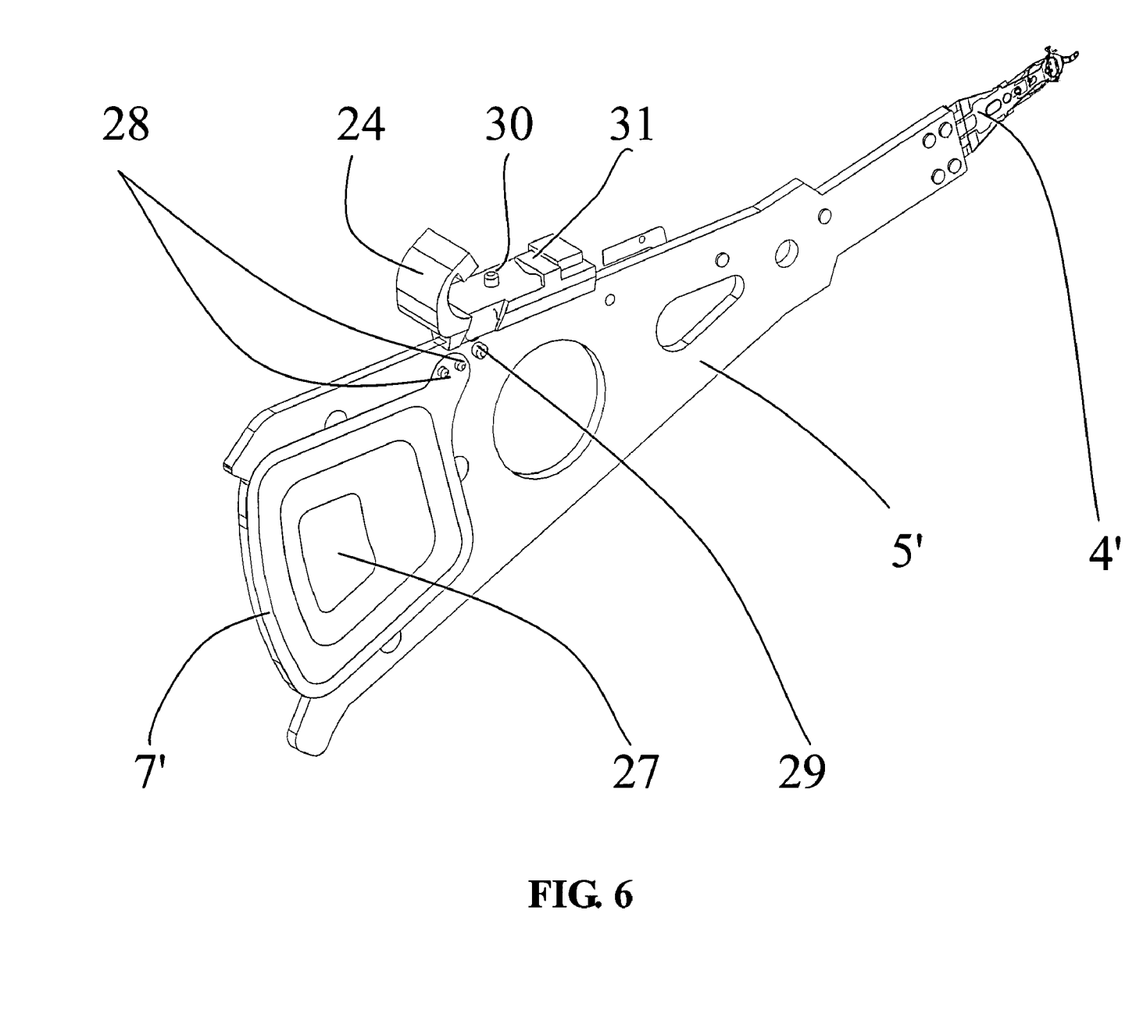
FIG. 6 is a perspective view of a second HAA of the HSA in FIG. 5.

Referring to FIG. 6, the second HAA 22 comprises a second head gimbal assembly having a second suspension 4' and a second slider 3'(see FIG. 9), a second drive arm 5' to be connected with to the second suspension 4', a bracket 24 positioned on one side of the second drive arm 5', and a voice coil 7' embedded in the second drive arm 5' for controlling the motion of the second drive arm 5'. In an embodiment of the invention, the bracket 24, the second suspension 4', and the voice coil 7' are overmolded onto the second drive arm 5'.

Figure 5:
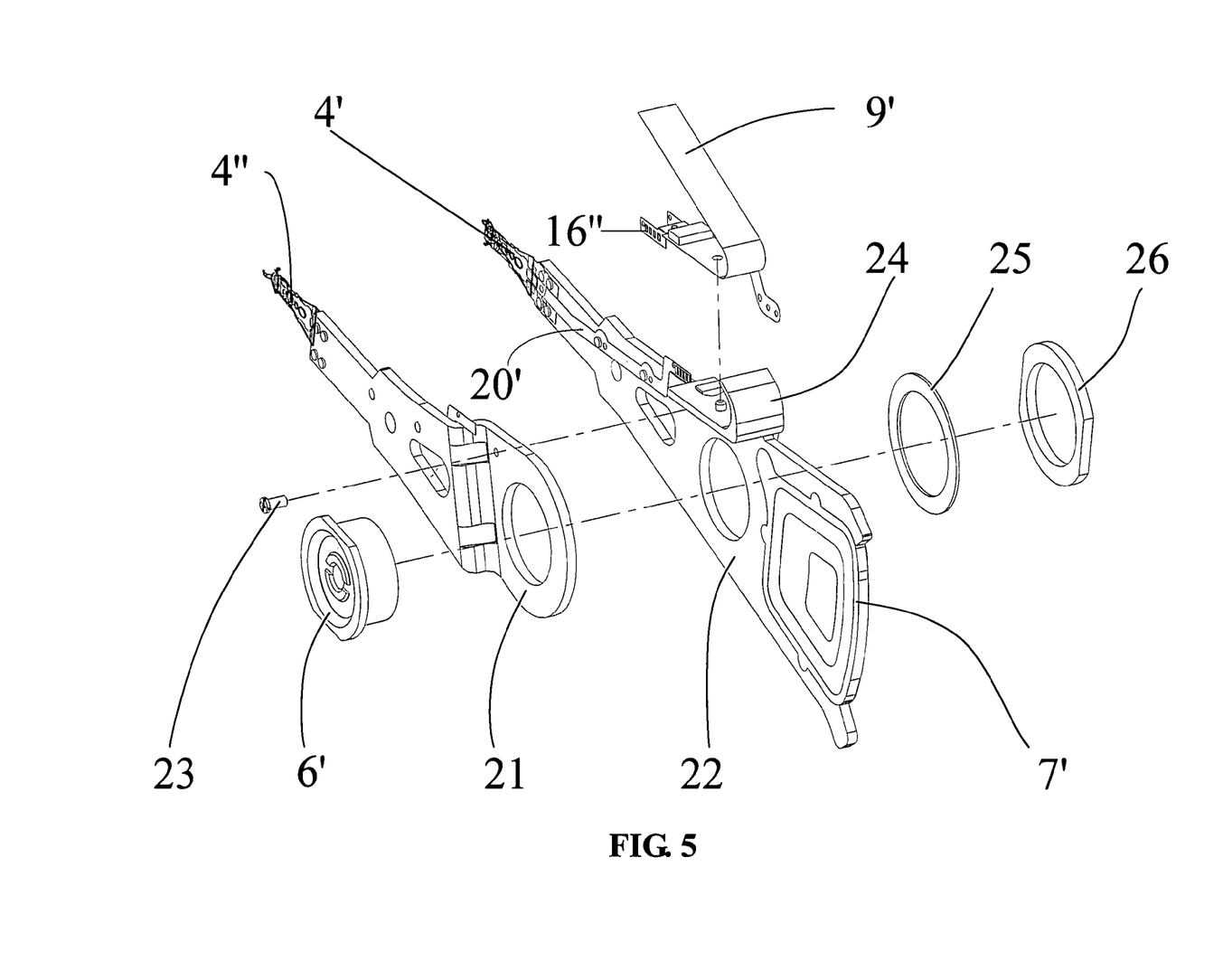
FIG. 5 is an exploded, perspective view of the HSA of FIG. 4.
Figure 9:
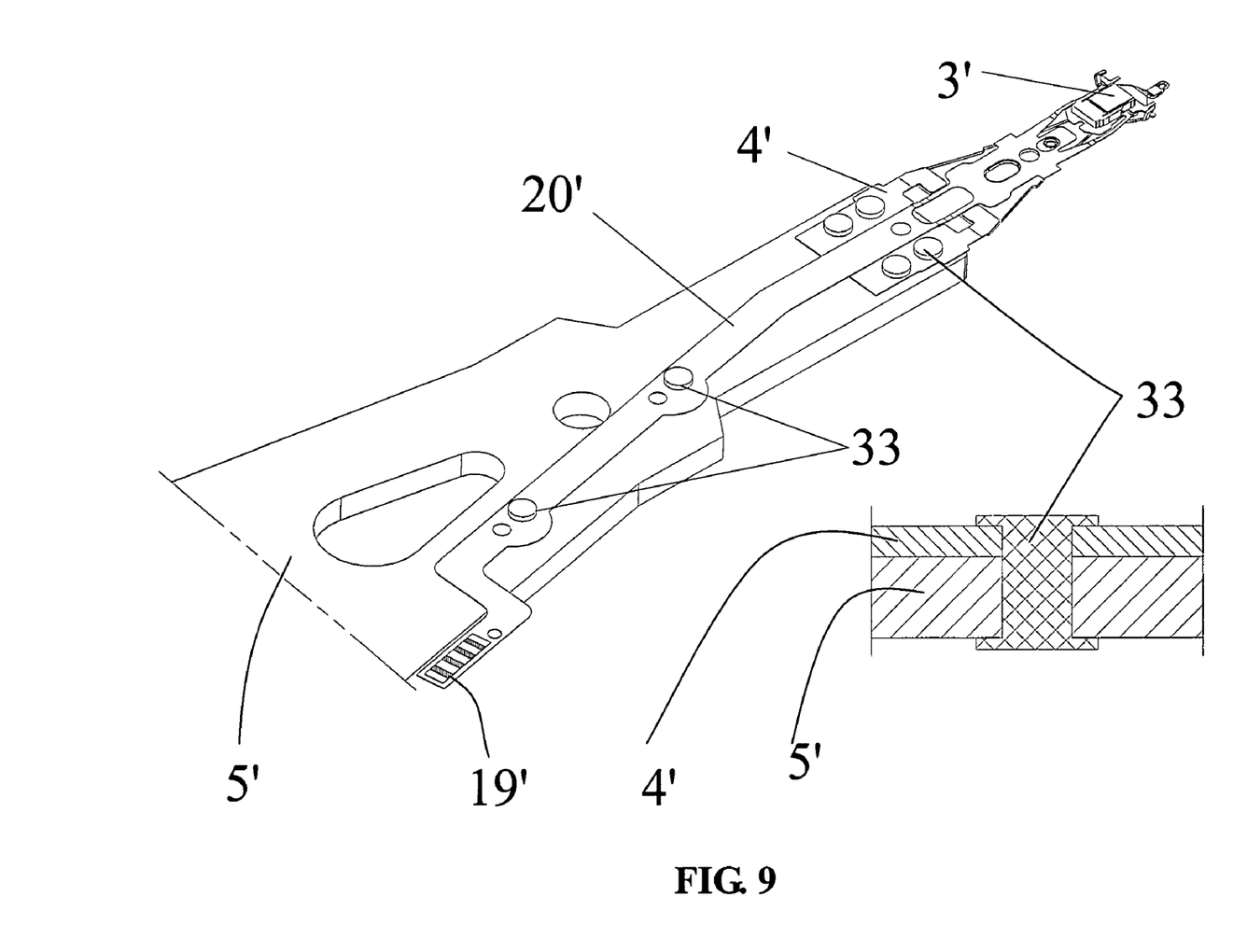
FIG. 9 is a partial, enlarged perspective view of the second HAA in FIG. 6.
Figure 10:
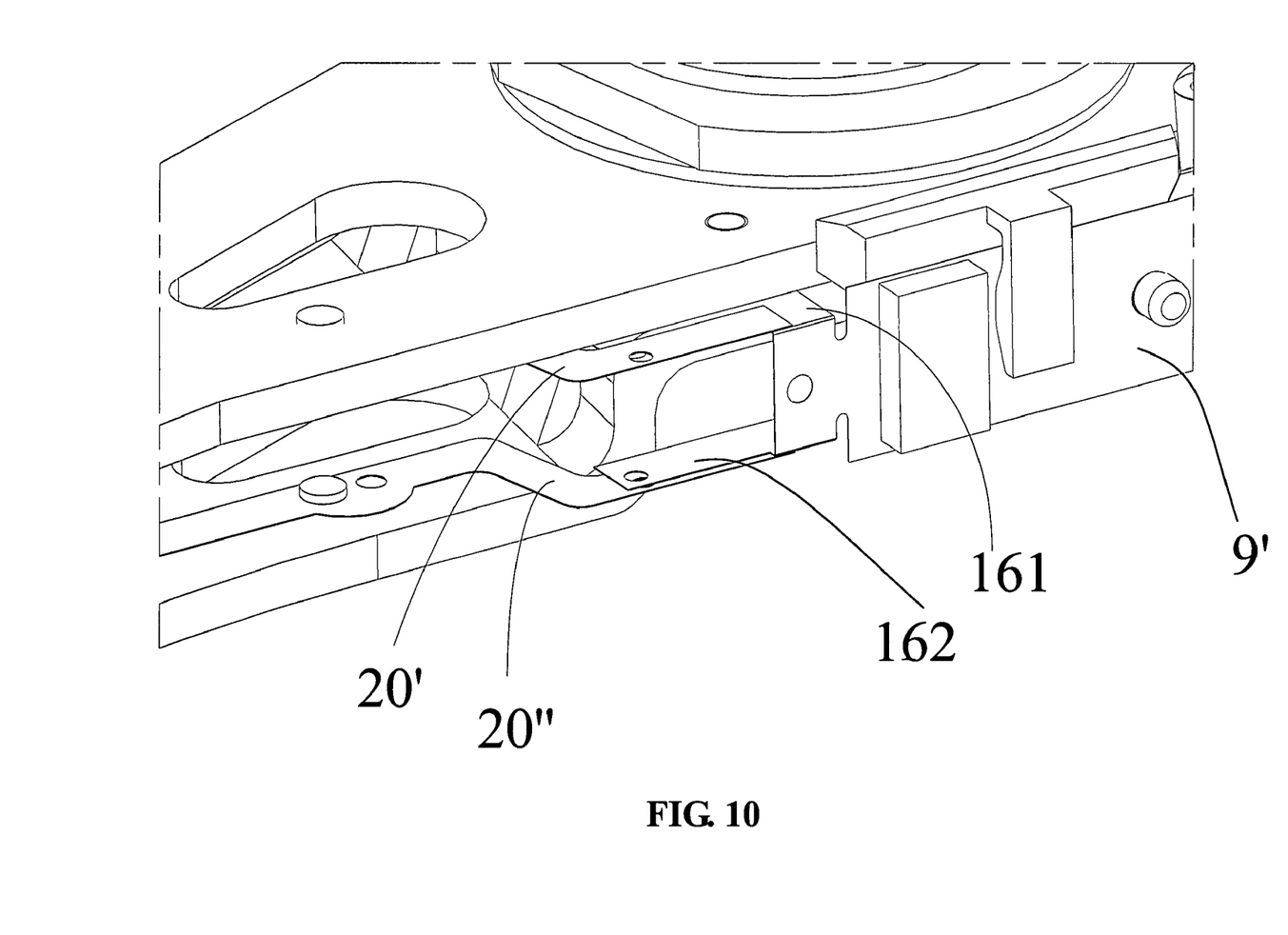
FIG. 10 is a partial, enlarged perspective view of the HSA in FIG. 4 showing an electrical connection between the suspension flexure cables and the FPCA.

In the present invention, with reference to FIGS. 5, 6 and 9, the second suspension 4' has a second suspension flexure cable 20' coupled thereon by overmold which runs from the second slider 3' toward the bracket 24. To make the invention easily understood, a detailed view of overmold status of the second HAA 22 is shown in FIG. 9. There are at least two overmold pins 33 used for the attachment of the second suspension 4', and at least two overmold pins 33 used for the attachment of the second suspension flexure cable 20'. In the present invention, an overmold status of the first HAA 21 is similar to that of the second HAA 22 and a detail view thereof is omitted herefrom. A plurality of bonding pads 19' is provided on an end of the second suspension flexure cable 20'. The second drive arm 5' is provided with a grounding pin 29 and two embedded connection pins 28 near the bracket 24. The voice coil 7' is driven by a VCM (not shown), which is provided two voice coil leads (not shown) soldered with the connection pins 28. Also, a balance plate 27 is mounted in the voice coil 7' to balance the motion of the second drive arm 5'. The connection pins 28, the voice coil 7' and the balance plate 27 are overmolded onto the drive arm 5' together.

Figure 7A:
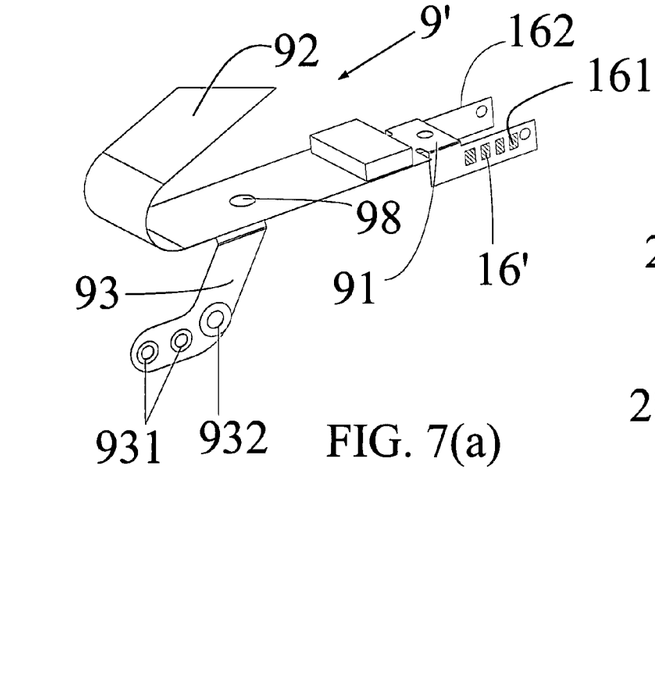
FIG. 7(a) is an enlarged, perspective view of a FPCA of the HSA in FIG. 5.
Figure 7B:
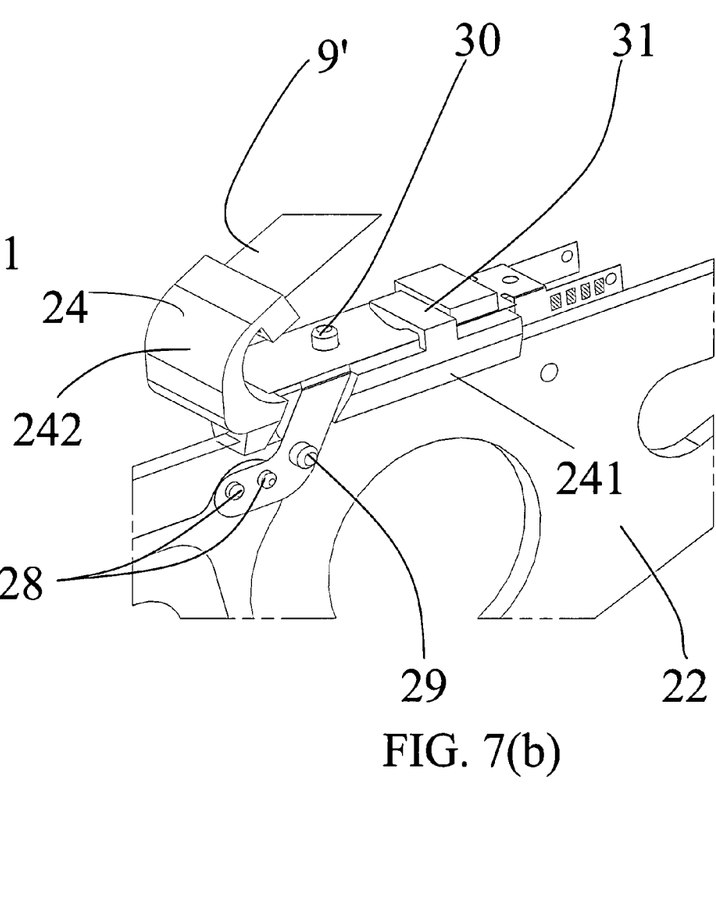
FIG. 7(b) is an enlarged, perspective view of the FPCA with a bracket of the second HAA in FIG. 6.

Referring to FIG. 7(b), the bracket 24 comprises a bracket body 241 and a guiding rail 242 extending from one end of the bracket body 241. The bracket body 241 has a bracket clamp 31 extending from one side thereof and an alignment pin 30 formed thereon. A FPCA 9' is aligned with the bracket 24 by the alignment pin 30 and fixed by the bracket clamp 31. Referring to FIG. 7(a), the FPCA 9' comprises a flexible printed circuit (FPC) 92, a U-shaped connector 91 formed to one end of the FPC 92, and a connection leg 93 extending from one side of the FPC 92. The FPC 92 has an alignment hole 98 formed therein corresponding to the alignment pin 30 to receive the alignment pin 30. The connection leg 93 has two voice coil pads 931 and a grounding pad 932 formed thereon, the two voice coil pads 931 are provided for the connection pins 28 to extend through, and the grounding pad 932 is provided for the grounding pin 29 to extend through. The U-shaped connector 91 comprises two connection plates 161, 162 with a plurality of connecting pads 16' and 16" (see FIG. 5) thereon, respectively. To satisfy the configuration of the guiding rail 242, the flexible printed circuit (FPC) 92 is folded to contact with the inner surface of the guiding rail 242.

Referring to FIGS. 7(a) and 7(b), in the present invention, the voice coil pads 931 and the grounding pad 932 of the FPCA 9' are electrically coupled with the connection pins 28 and the grounding pin 29 by soldering. At the same time, the voice coil leads (not shown) are electrically connected with the voice coil pads because the voice coil leads (not shown) are soldered with the connection pins 28.

Figure 11:
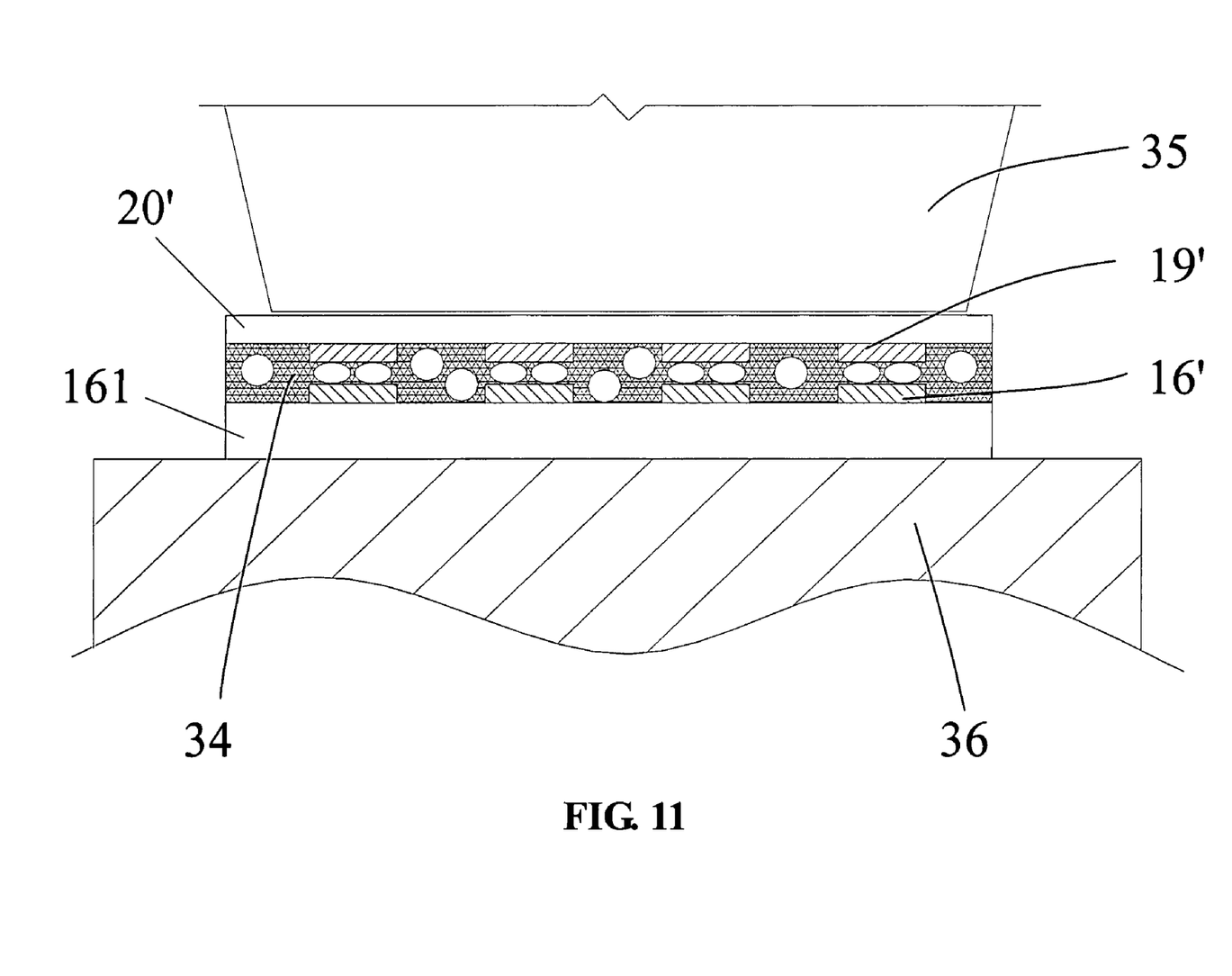
FIG. 11 is a schematic view showing a process of electrical connection between the suspension flexure cable and the FPCA.

In the present invention, the bonding pads 19', 19" of the first and second suspension flexure cable 20' and 20" are electrically coupled with the connecting pads 16', 16" of the FPCA 9' by epoxy. Referring to FIG. 11, in an embodiment, the epoxy is a tacky electrical conductive film 34, such as Anisotropic Conductive Film (ACF), which adheres to and cover the bonding pad 19' of the second suspension flexure cable 20'. Then, the conductive film 34 is pressed against the connecting pad 16' of the FPCA 9' by a bonding tip 35 to bond the bonding pad 19' with the connecting pad 16' together. The bonding tip 35 is heated and then compresses the conductive film 34 to start the curing process. In an embodiment, an additional support plate 36 is inserted into the U-shaped connector 91 for support. Similarly, the bonding pads 19" of the first suspension flexure cable 20" are electrically coupled with the connecting pads 16" of the FPCA 9' and a detailed description thereof is omitted herefrom.

It is understood that the invention may be embodied in other forms without departing from the spirit thereof. Thus, the present example and embodiment are to be considered in all respects as illustrative and not restrictive, and the invention is not to be limited to the details given herein.

What is claimed is:

1. A method for manufacturing a head stack assembly of a disk drive unit, comprising:
   forming a first head arm assembly wherein the first head arm assembly is formed by:
   forming a first head gimbal assembly;
   providing a raw drive arm and stamping a portion of the raw drive arm to form a spacer; and
   coupling the first head gimbal assembly with the stamped drive arm together;
   forming a second head arm assembly wherein the second head arm assembly is formed by:
   forming a second head gimbal assembly, a second drive arm and a voice coil;
   coupling the second head gimbal assembly, the second drive arm and the voice coil together; and
   assembling the first and second head arm assemblies together; wherein
   forming the second head arm assembly further comprises forming a flexible printed circuit assembly thereon wherein the flexible printed circuit assembly is formed by:
   forming a flexible printed circuit having at least one alignment hole and a connection leg with two voice coil pads and a grounding pad thereon;
   forming a connector; and
   coupling the flexible printed circuit with the connector together; and
   forming the second drive arm comprises forming a grounding pin and two connection pins thereon.

2. The method for manufacturing a head stack assembly according to claim 1, wherein forming the first and second head arm assembly further comprises forming at least one undercut on the spacer.

3. The method for manufacturing a head stack assembly according to claim 1, wherein forming the second drive arm comprises forming a bracket on one side thereof.

4. The method for manufacturing a head stack assembly according to claim 3, wherein forming the bracket comprises:
   forming a guiding rail and a bracket body having at least one bracket clamp and at least one alignment pin.

5. The method for manufacturing a head stack assembly according to claim 4, wherein forming the additional head arm assembly comprises aligning the flexible printed circuit assembly with the bracket by the at least one alignment pin and fixing the flexible printed circuit assembly by the at least one bracket clamp.

6. The method for manufacturing a head stack assembly according to claim 1, wherein forming the additional head arm assembly further comprises electrically coupling the two voice coil pads and the grounding pad with the connection pins and the grounding pin, respectively.

7. The method for manufacturing a head stack assembly according to claim 1, wherein forming the connector comprises forming two connection plates each having a plurality of connecting pads thereon, and forming each of the two head gimbal assemblies comprises forming a suspension flexure cable having a plurality of bonding pads thereon.

8. The method for manufacturing a head stack assembly according to claim 7, wherein forming the additional head arm assembly further comprises electrically coupling the connecting pads of the two connection plates with the bonding pads of the two suspension flexure cables, respectively.

9. A method for manufacturing a head stack assembly of a disk drive unit, comprising forming a head arm assembly wherein the head arm assembly is formed by:
   forming a head gimbal assembly;
   providing a raw drive arm and stamping a portion of the raw drive arm to form a spacer;
   forming at least one undercut on the spacer to strengthen the drive arm; and coupling the head gimbal assembly with the stamped drive arm together.

10. The method for manufacturing a head stack assembly according to claim 9, wherein the method further comprises forming an additional head arm assembly and assembling the two head arm assemblies together.

11. The method for manufacturing a head stack assembly according to claim 10, wherein forming the additional head arm assembly comprises:
   forming a second head gimbal assembly, a second drive arm and a voice coil;
   coupling the second head gimbal assembly, the second drive arm and the voice coil together.

12. The method for manufacturing a head stack assembly according to claim 11, wherein forming the second drive arm comprises forming a bracket on one side thereof.

13. The method for manufacturing a head stack assembly according to claim 12, wherein forming the bracket comprises:
   forming a guiding rail and a bracket body having at least one bracket clamp and at least one alignment pin.

14. The method for manufacturing a head stack assembly according to claim 13, wherein forming the additional head arm assembly further comprises forming a flexible printed circuit assembly thereon.

15. The method for manufacturing a head stack assembly according to claim 14, wherein forming the additional head arm assembly comprises aligning the flexible printed circuit assembly with the bracket by the at least one alignment pin and fixing the flexible printed circuit assembly by the at least one bracket clamp.

16. The method for manufacturing a head stack assembly according to claim 14, wherein forming the flexible printed circuit assembly comprises:
   forming a flexible printed circuit having at least one alignment hole and a connection leg;
   forming a U-shaped connector; and
   coupling the flexible printed circuit with the connector together.

17. The method for manufacturing a head stack assembly according to claim 16, wherein forming the connection leg comprises forming two voice coil pads and a grounding pad thereon, and forming the second drive arm comprises forming a grounding pin and two connection pins thereon.

18. The method for manufacturing a head stack assembly according to claim 17, wherein forming the additional head arm assembly further comprises electrically coupling the two voice coil pads and the grounding pad with the connection pins and the grounding pin, respectively.

19. The method for manufacturing a head stack assembly according to claim 16, wherein forming the connector comprises forming two connection plates each having a plurality of connection pads thereon, and forming each of the two head gimbal assemblies comprises forming a suspension flexure cable having a plurality of bonding pads thereon.

20. The method for manufacturing a head stack assembly according to claim 19, wherein forming the additional head arm assembly further comprises electrically coupling the connection pads of the two connection plates with the bonding pads of the two suspension flexure cables, respectively.

* * * * *